T. D. MILLEA.
COMBINED PRESSURE REDUCING AND RELIEF VALVE.
APPLICATION FILED FEB. 19, 1917.
1,242,713.
Patented Oct. 9, 1917.
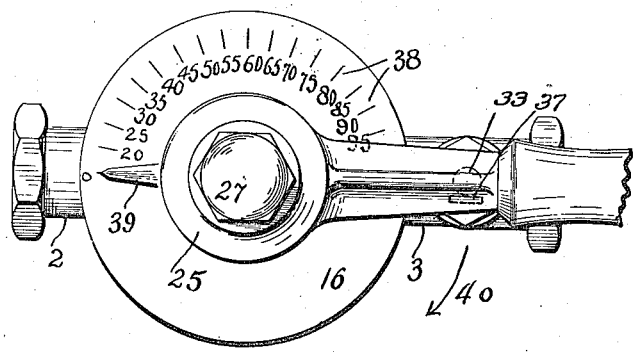
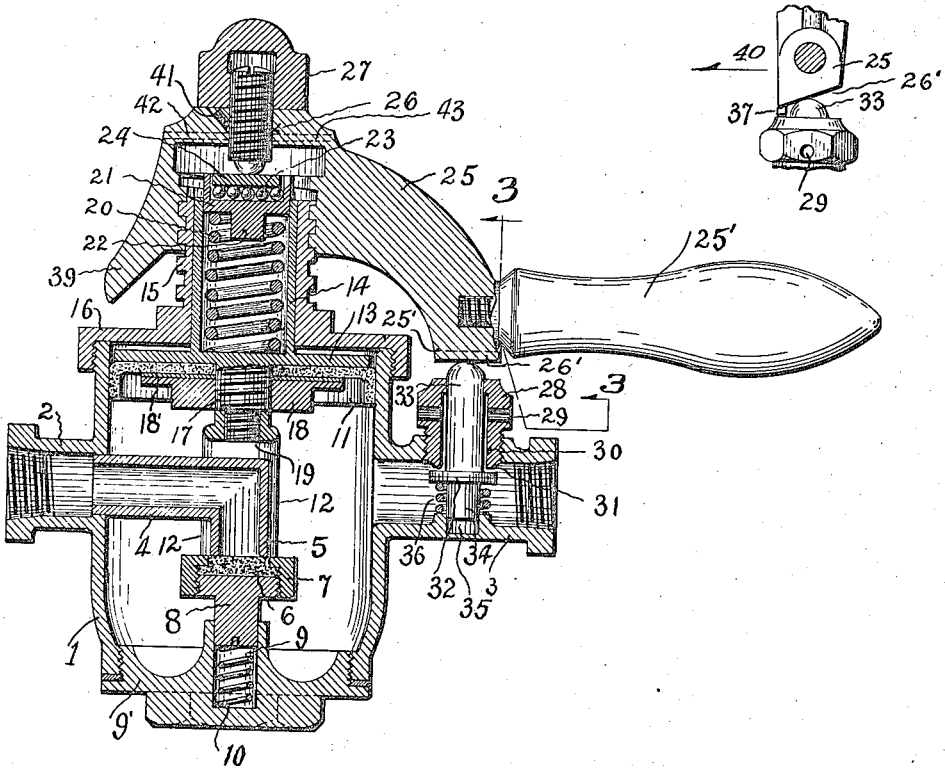
Inventor:
Thomas D. Millea.
By Harry W. Bown.
Attorney

UNITED STATES PATENT OFFICE.

THOMAS D. MILLEA, OF SPRINGFIELD, MASSACHUSETTS, ASSIGNOR TO TRY ME MANUFACTURING COMPANY, OF SPRINGFIELD, MASSACHUSETTS, A CORPORATION OF MASSACHUSETTS.

COMBINED PRESSURE REDUCING AND RELIEF VALVE.

1,242,713.　　　Specification of Letters Patent.　　　Patented Oct. 9, 1917.

Application filed February 19, 1917. Serial No. 149,443.

*To all whom it may concern:*

Be it known that I, THOMAS D. MILLEA, a citizen of the United States of America, residing in the city of Springfield, county of Hampden, and State of Massachusetts, have invented certain new and useful Improvements in Combined Pressure Reducing and Relief Valves, of which the following is a specification.

This invention relates to improvements in valves which are particularly designed for reducing the pressure of air or other fluid as it flows from a suitable source of supply to the point where the pressure is to be utilized. It is particularly designed for use in connection with the inflation of automobile tires where the supply of compressed air is contained in a suitable supply tank, usually maintained under a high pressure, one side of the valve being connected with the supply and the other to a connection leading to the tire to be inflated. It is an improvement on the type of reducing valve shown in my prior Patent No. 1,196,377, dated Aug. 29, 1916.

An object of the present invention is to provide an automatic pressure relief device in connection with the pressure reducing feature. This relief device is designed to automatically operate when the supply of compressed air or other fluid is shut off whereby the air, or other fluid that is contained in the casing on the low pressure side of the inlet valve is permitted to automatically escape to the atmosphere, thus bringing the pressure on this side of the inlet valve back to zero or that of the atmosphere.

A further object of the invention is to provide means for adjusting a compression spring which controls the inlet valve whereby any pressure desired may be delivered from the supply tank to the tire or other article that is being inflated.

A further object is to provide means for causing the operating handle to always exert an axial pressure on the compression spring without imparting a twisting movement thereto when said handle is operated.

A further object is to provide means for placing a pressure or load on the compression spring prior to the operation of the operating handle for the purpose of initially adjusting the spring. Other objects of the present invention will be set forth in the body of the specification and will be particularly pointed out in the claims forming a part of the specification hereof.

Referring to the drawings:

Figure 1 is a sectional view considered in a vertical plane passing through the axis of the valve, and showing the inlet and exhaust extensions, the tension spring, the automatic relief valve, and the means for adjusting the compression spring;

Fig. 2 is a plan view showing the upper portion of the valve, and the pressure indicating pointer which moves with the operating handle and is designed to move over a series of graduations for indicating the pressure on the reducing side of the valve;

Fig. 3 is a detail view on the section line 3—3 showing the inclined surface on the operating handle for automatically opening the relief valve when the handle is swung into the inoperative or shut off position.

Referring to the drawings in detail: 1 indicates the inclosing casing which is formed with threaded inlet and discharge extensions 2 and 3, respectively. Communicating with the inlet extension 2 is an angular shaped entrance member 4 having a downwardly extending fluid discharging portion 5. This member may be formed integral with the casing 1 or made separate and attached thereto in any suitable manner, as desired. The portion 5 is normally closed by means of the valve 6 which comprises a packing that is retained in the hollow threaded casing 7 by means of the downwardly extending threaded piece or part 8, the lower end of which is located in the chambered out part 9 of the cap 9′. Also located in the chambered out part 9 and engaging the lower end of part 8 is the compression spring 10, the upward tension of which is great enough to normally maintain the valve 6 closed against the pressure in the supply tank. The valve 6 is connected to the cup-shaped piston 11 by means of the yoke 12. Located above and upon the cup-shaped piston packing 11 is a plate 13 which has formed integral therewith the upwardly extending cylindrical tubular member 14 which is located and moves up and down within the exteriorly threaded extension portion 15 of the cover plate 16. The plate 13 is formed with an exteriorly threaded depending extension 17 on which the clamping nut 18 for the packing 11 is threaded and the lower end of the part 17 is formed with a reduced threaded portion 19 to which the yoke 12 is attached. The cup-shaped piston packing 11 is, therefore, rigidly clamped between the plate 13 and the nut 18. In order to prevent the nut cutting the packing a thin disk of metal 18' is inserted between the packing and nut, as shown.

Located within the tubular extension 14 is a compression spring 20 and seated upon the upper end of this spring is a cap plate 21, the lower side of which is formed with a projection 22 which enters the inside of the spring 20 for the purpose of accurately guiding this plate, and located in the recessed portion of the cap 21 are anti-friction balls 23 and engaging and confining these anti-friction balls is the plate or disk 24.

The operating handle is indicated at 25, to which the hand engaging part 25' is secured. This handle is formed with interior threads which engage the exteriorly threaded upwardly extending member 15 which member is formed integral with the cap plate 16, as stated. The upper portion of the handle is provided with an adjusting screw 26, the lower end of which engages the plate 24. This screw is for the purpose of varying the compression of the spring 20 and is normally covered and protected by means of the cap and lock nut 27.

Referring now to the construction of the automatic relief valve which is mounted in the discharge connecting piece 3: 28 designates a plug which is threaded into an opening in this extension piece and is formed with the transverse openings or passageways 29 and the enlarged opening or passageway 30 which, as shown, communicates with the openings 29. The lower end 31 of the plug 28 is formed as a valve seat against which the valve 32 is adapted to engage. Normally when the device is not in use the relief valve 32 is in the open position shown leaving the passageways 30 and 29 open to the interior of the extension 3. The valve 32 is formed integral with or attached to the oppositely extending stems 33 and 34, the stem 33 projecting upwardly through the top of the threaded plug 28 and the stem 34 projecting downwardly into the recess 35. These two stems, therefore, serve to accurately guide the valve 32 in its opening and closing movements. Located between the valve 32 and the lower inner surface of the extension 3 is a coiled compression spring 36. The depending portion 25' of the handle 25 is formed with an inclined surface 26' (see Fig. 3) which engages the upper end of the stem 33 for the purpose of holding the valve 32 in the open position, as shown, when the inlet valve is closed. Attached to the handle 25 and adjacent the inclined surface portion 26' is a downwardly extending projection or lip 37, whereby the handle is prevented from being moved in a contraclockwise direction beyond the zero position.

The cap or cover plate 16 is formed with graduations 38, which indicate the pressure that is allowed to pass through the reducing valve from the inlet projection 2 to the discharge projection 3. These graduations are suitably numbered as for example, 20, 25, 30, 35, 40, etc., up to, say 120. The pointer 39 as is understood moves over the cover 16 and adjacent the figures shown.

Referring now to the operation of the reducing and relief valve: The operating handle 25 is to be considered in its initial or normal position, as shown, with the pointer 39 at the first graduation or zero pressure mark. As the handle 25' is turned in the direction of the arrow 40 the pointer 39 will travel over the graduations 38 on the cover plate 16. In order to adjust the reducing valve, the pointer 39 is first moved by the operator so as to register with any one of the graduations 38, say the one indicating "20" pounds pressure. The screw 26 is then turned downward so as to compress the spring 20 which, in turn through the connecting members 13, 17, 18, 19 and 21 will cause the valve 6 to open allowing the fluid which is contained under pressure in the supply tank to flow through the casing to the discharge extension piece 3. It is to be understood that an accurately calibrated pressure gage (not shown) is included in the connections leading from the discharge extension 3 in order that the operator may know when the screw 26 has been turned down the correct distance in order to have the reduced pressure on the low pressure side register with the number indicated by the pointer 39. This operation, therefore, checks the accuracy of the reducing valve. After these adjustments are made the graduations 38 are marked for future reference when the valve is used and all the operator is obliged to do in order to obtain any desired pressure is to move the handle 25 and pointer 39 to the number indicating the pressure desired.

It will be seen from this construction that when the handle 25 is moved in a clockwise direction it will, at the same time travel downward on the threaded extension 15 thus placing the spring 20 under more and more compression as the handle is rotated through a greater angle from right to left. As the handle is moved from its initial or zero position the relief valve 32 is at the same time automatically closed by means of the spring 36. At the same time the inlet valve 6 is opened. It is to be understood that the spring 10 is of such strength as to exert an upward pressure that is greater than the pressure in the supply tank which is connected to the inlet extension 2, whereby the inlet valve 6 is moved to a closed position when the handle is turned to its initial or zero position. Upon opening the inlet valve 6 the air or other fluid under pressure passes into the casing 1 and acts on the cup-shaped piston packing 11. The ratio of the area between the piston packing 11 and the opening in the extension 5 is such that the pressure as it escapes through the extension 3 is reduced, the adjustment of the spring 20 by the screw 26 determines, as stated, the amount of the reduction, and the graduations on the cover plate 16 indicating the pressure of the fluid as it escapes through the discharge extension 3. The operator, after adjustment, therefore, has an accurate means by reference to the graduations 38 of knowing exactly at what pressure the tire is being inflated by simply referring to these graduations as the handle 25 gradually compresses the spring 20 so that the equally spaced figures on the graduated part of the plate 16 will correctly indicate the pressure that is flowing through the reducing valve in the different positions of the handle except the zero position. After the tires are inflated the handle is moved back again into the zero position shown in Figs. 1 and 2. The spring 20 is not now under any compression thus leaving the spring 10 free to move the inlet valve 6 again to its seat, the tension of the spring 10 being of course greater than the pressure in the supply tank. The inclined surface 26' automatically opens the relief valve 32 as the handle assumes the initial position shown, thus allowing the confined air in the low pressure side of the valve to escape through the openings 30 and 29 to the atmosphere. This relief valve always insures that there is no pressure confined in the casing 1 when the valve is not in use and when the extension 3 is again connected there is no initial pressure to mislead or confuse the operator.

The screw 26, it should be stated, must be provided with some means for permanently retaining the same in a fixed position after it is turned into a position to exert a pressure on the spring 20 so that, as the pointer or indicator 39 on the handle 25 indicates a given pressure, as 20, on the cover 16, that pressure and no other will flow through the casing 1 to the discharge extension 3. This retaining means, as shown, comprises a screw or pin 41 which is seated in a recess that is formed partly in the handle 25 and partly in the screw 26, it being understood that this recess is not formed until after the set screw 26 is turned into its correct position. If desired the screw 41 may be omitted and the cap 27 be employed to serve as a lock nut for the set screw 26. This is not desirable as it would permit an unauthorized person to tamper with the apparatus and change the adjustment. If desired a hole 42 may be bored through the screw 26 and the upper portion of the handle and a pin 43 inserted to hold the screw in stationary position after the adjustment has been effected.

It may be stated that the first one of the graduation marks 38, indicating 20 pounds pressure, is the position when the inclined surface 26' of the handle 25 just frees itself from the stem 33 and allows the valve 32 to close. The set screw 26 is then turned down until the pressure 20 is indicated on the testing gage that is connected to the outlet extension 3. The handle 25 will, as it moves downward on the screw threads 15 exert equal pressures for equal arcs, whereby the graduations 38 are also equal as can be readily checked up by the testing gage.

What I claim is:

1. In a valve of the kind described, the combination with an inclosing casing having entrance and discharge portions, a relief valve in the discharge portion of the casing, an inlet valve, a piston connected to the inlet valve, an operating handle for automatically opening the relief valve as said handle assumes its normal or zero position, means to close the relief valve as the operating handle is moved away from its zero or initial position, a cover plate for said casing having a threaded portion, the handle having engagement with the threaded portion of the cover, a compression spring, operative connecting means between the spring, piston, and inlet valve, said spring being designed to be compressed as the handle is moved from its initial or zero position for the purpose of automatically varying the pressure of the fluid as it flows through the casing.

2. In a device of the kind described, the combination with an inclosing casing having inlet and discharge portions, an inlet valve for controlling the flow of the liquid through the casing, a handle for operating the valve, means engaged by the handle when in its normal or zero position for automatically releasing the confined air on the low pressure side of the inlet valve, a piston connected to the inlet valve, a cover plate for the casing formed with a threaded portion, said handle having connection with the threaded portion of the cover plate, and operative connecting means between the handle and the inlet controlling valve for automatically varying the difference in pressure between the inlet and discharge portions.

3. A reducing and relief valve comprising in combination with an inclosing casing, a cover for the casing having a threaded part, a fluid inlet member, an inlet valve for closing the same, a piston connected to the inlet valve, a spring located above and below the piston and valve respectively, an operating handle engaging the threaded part of the cover and designed when the same is operated to compress the spring above the piston to open the inlet valve whereby the pressure of the fluid which flows through the casing will be varied, and a relief valve operated simultaneously by the handle as the inlet valve is closed.

4. A reducing and relief valve comprising in combination with an inclosing casing, a cover for the casing, a threaded part attached to the cover, a fluid inlet member, an inlet valve for closing the same, a piston connected to the inlet valve, a spring located above and below the piston and valve respectively, an operating handle engaging the threaded part of the cover and designed when the same is operated to compress the spring above the piston to open the inlet valve whereby the pressure of the fluid which flows through the casing will be varied, and a relief valve operated by the handle when the inlet valve is closed, and means for automatically closing the relief valve when the inlet valve is opened.

5. The combination in a device of the kind described, of a casing having inlet and discharge extensions, an inlet valve, a piston connected thereto, a relief valve, an operating handle, a compression spring acting on the piston for varying the pressure of the fluid as it is discharged, means for controlling the compression of the spring when the handle is operated, means for adjusting the compression of the spring independently of the handle, said handle being designed to open the relief valve when the spring is at zero compression and the inlet valve stands in a closed position.

6. In a combined pressure reducing and relief valve, a casing having inlet and discharge openings, an inlet valve, a cover for the casing formed with a threaded extension, an operating handle engaging the threaded extension, a piston on the discharge side of the casing having a hollow extension and slidably arranged within the threaded extension, a cap-plate on the spring, means for engaging the cap-plate to initially compress the spring for adjusting the same, the piston being connected to the inlet valve, whereby when the operating handle is operated the spring will be compressed in accordance with the extent of movement of the handle, the inlet valve will be opened and the pressure at the discharge opening will be varied, and means to open the relief valve when the handle is in its initial or zero pressure position, and means to automatically close the inlet valve as the handle assumes the zero pressure position.

7. A device of the kind described comprising an inclosing casing having inlet and discharge ports, an inlet valve, a piston connected thereto, an operating handle, means to control the inlet valve and piston from the handle, a relief valve in the discharge port, said handle having a part to move the relief valve to open position when the handle is in a normal position and the inlet valve is in a closed position.

8. In a pressure reducing device, the combination with an inclosing valve casing, a piston and an inlet valve therein, said piston being connected to the valve, a spring mounted on the piston, the opposite end of the spring having a recessed follower plate thereon, an anti-friction device in the recessed portion of the follower, a plate engaging the anti-friction device, means engaging the plate for placing the spring under initial compression, and means including said spring compressing means for placing the spring under additional compression for operating the piston and valve, said last named means having a pointer for indicating the pressure of the fluid as it escapes from the discharge side of the casing.

9. In a pressure reducing device for fluids, the combination with an inclosing valve casing, an inlet valve and a piston in the casing, said piston being connected to the inlet valve, a cover plate having threads thereon, a follower plate on the piston formed with a tubular extension mounted within the threaded part of the cover plate, a spring in the tubular extension, an operating handle engaging the threaded part of the cover plate for compressing the spring, said handle comprising means for initially compressing the spring independently of the movement of the handle for adjusting the spring, and a relief valve under the control of the operating handle to open the same as the inlet valve closes.

10. In a pressure reducing device for fluids, the combination with an inclosing valve casing, an inlet valve and a piston in the casing, said piston being connected to the inlet valve, a cover plate having threads thereon and graduations on said plate, a follower plate on the piston formed with a tubular extension mounted within the threaded part of the cover plate, a spring in the tubular extension, an operating handle engaging the threaded part of the cover plate for compressing the spring, said handle comprising means for initially compressing the spring independently of the movement of the handle for adjusting the spring to agree with the graduations on said plate, and a relief valve under the control of the operating handle to open the same as the inlet valve closes.

THOMAS D. MILLEA.